(12) United States Patent
Wei et al.

(10) Patent No.: US 6,371,535 B2
(45) Date of Patent: *Apr. 16, 2002

(54) EASILY RELEASABLE LOCKING DEVICE FOR DETACHABLY SECURING A BATTERY PACK TO A PORTABLE BATTERY-POWERED APPARATUS

(75) Inventors: Chih-Hsien Wei, Taipei; Dong-Sen Chen, Taipei Hsein, both of (TW)

(73) Assignee: Mitac International Corporation (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,837

(22) Filed: Aug. 30, 1999

(51) Int. Cl.$^7$ .................................................. E05C 1/10
(52) U.S. Cl. ........................ 292/175; 429/97; 429/100
(58) Field of Search .......................... 292/175, 163, 292/DIG. 4, 42; 429/96, 100, 97

(56) References Cited

U.S. PATENT DOCUMENTS

| | | | | |
|---|---|---|---|---|
| 4,223,787 A | * | 9/1980 | Lowry | 206/387 |
| 5,092,788 A | * | 3/1992 | Pristupa | 439/225 |
| 5,460,906 A | * | 10/1995 | Leon | 429/97 |
| 5,535,437 A | * | 7/1996 | Karl | 455/90 |
| 5,576,929 A | * | 11/1996 | Uchiyama | 361/680 |
| 5,620,244 A | * | 4/1997 | Yang | 312/333 |
| 5,663,011 A | * | 9/1997 | Bunyan | 429/97 |
| 5,671,958 A | * | 9/1997 | Szapucki | 292/175 |
| 5,714,716 A | * | 2/1998 | Yamada | 174/52.1 |
| 5,716,730 A | * | 2/1998 | Deguchi | 429/97 |
| 5,764,477 A | * | 6/1998 | Ohgami | 361/683 |
| 5,967,570 A | * | 10/1999 | Lee | 292/31 |
| 6,108,196 A | * | 8/2000 | Jung | 361/683 |
| 6,109,669 A | * | 8/2000 | Pinkow | 292/175 |
| 6,134,116 A | * | 10/2000 | Hoss | 361/347 |
| 6,136,467 A | * | 10/2000 | Phelps | 429/97 |
| 6,261,715 B1 | * | 7/2001 | Nakamura | 429/100 |

* cited by examiner

Primary Examiner—Gary Estremsky
(74) Attorney, Agent, or Firm—Lowe Hauptman Gilman & Berner, LLP

(57) ABSTRACT

An easily releasable locking device includes upper and lower assemblies of latch and cavity members adapted to be disposed between a right lateral wall of a battery pack and a right inner side wall of a bottom wall of a portable battery-powered apparatus respectively, and aligned with each other and spaced apart in a transverse direction. The latch member and the cavity member of each assembly are disposed on the right inner side wall and the right lateral wall, respectively. The latch members are biased by two biasing members to be movable towards the corresponding cavity members. Two ejecting members are disposed between the right lateral wall and the right inner side wall, respectively. Each ejecting member is disposed along the transverse direction and is actuated in response to a manual movement which is against the biasing action of a respective biasing member to lift the right lateral wall of the battery pack to move away from the right inner side wall of the bottom wall of the portable battery-powered apparatus and out of a major surface of the bottom wall so as to rotate a left lateral wall of the battery pack, thereby facilitating removal of the battery pack from the portable battery-powered apparatus.

9 Claims, 4 Drawing Sheets

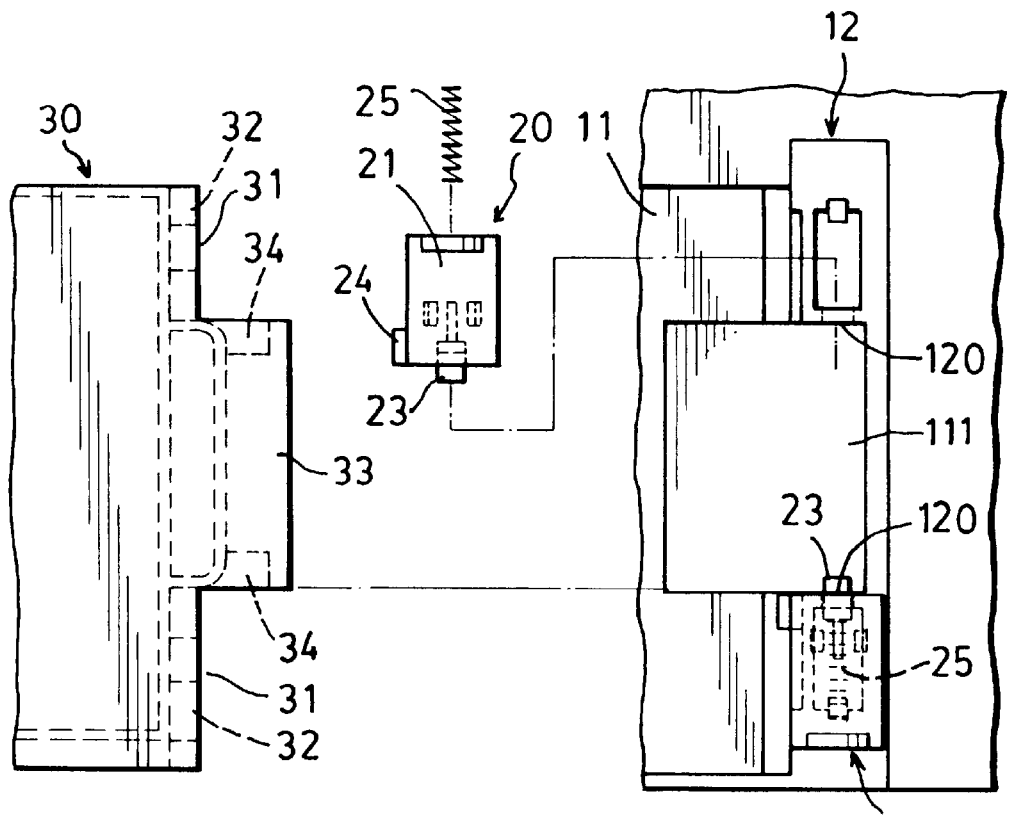
FIG.3
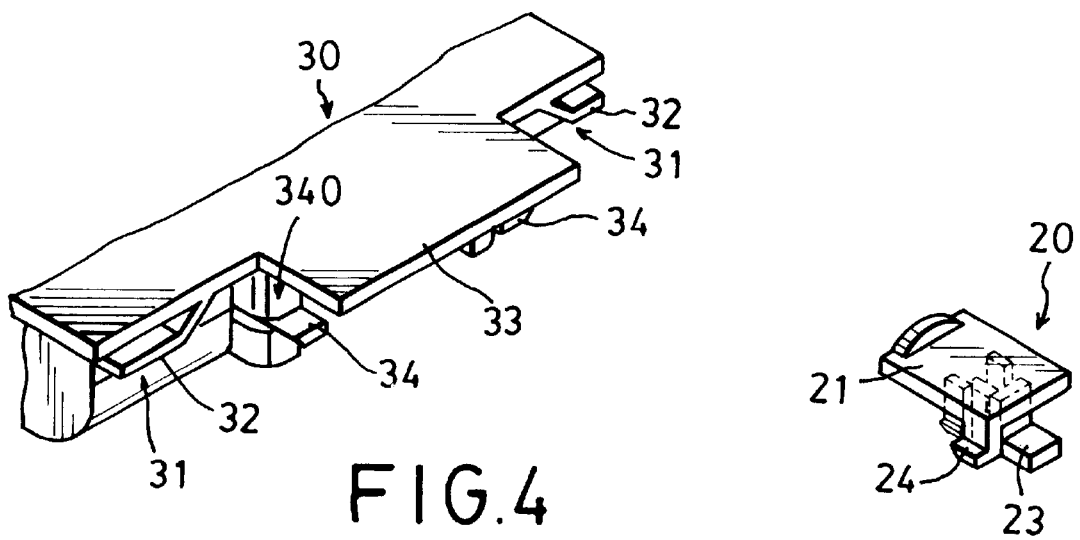
FIG.4
FIG.5

EASILY RELEASABLE LOCKING DEVICE FOR DETACHABLY SECURING A BATTERY PACK TO A PORTABLE BATTERY-POWERED APPARATUS

BACKGROUND OF THE INVENTION

1. Field of the Invention

This invention relates to a locking device for detachably securing a battery pack to a portable battery-powered apparatus, more particularly to an easily releasable locking device disposed between a battery pack and a bottom wall of a portable battery-power apparatus for securing the former to the latter.

2. Description of the Related Art

Referring to FIG. 1, a conventional portable computer 10 is shown to have an accommodation chamber 11 which is formed in a bottom wall 100 thereof for receiving a battery pack 15 and a locking device 14 therein. The locking device 14 is biased by a spring 17 toward the battery pack 15 such that a latch member 16 of the locking device 14 engages a cavity member 150 of the battery pack 15 for securing the battery pack 15 in the accommodation chamber 11. When the locking device 14 is moved away from the battery pack 15 against the biasing force of the spring 17 to move the latch member 16 away from the cavity member 150, the battery pack 15 can be removed from the portable computer 10.

However, only one assembly of the latch and cavity members 16, 150 is used to secure the battery pack 15, thereby resulting in unsteady assembly and untimely removal of the battery pack 15 from the portable computer 10 due to the weight of the battery pack 15. In addition, a tool is needed to lift the battery pack 15 after the assembly of the latch and cavity members 16, 150 is disengaged, thereby resulting in inconvenience when removing the battery pack 15.

SUMMARY OF THE INVENTION

The object of the present invention is to provide a locking device which can firmly secure a battery pack to a portable battery-powered apparatus, and which can be easily released for removal of the battery pack from the battery-powered apparatus.

According to this invention, the easily releasable locking device includes upper and lower assemblies of latch and cavity members adapted to be disposed between a right lateral wall of a battery pack and a right inner side wall of a bottom wall of a portable battery-powered apparatus respectively at first upper and lower positions that are aligned with each other and that are spaced apart from each other in a transverse direction. The latch member and the cavity member of each of the upper and lower assemblies at a respective one of the first upper and lower positions are adapted to be disposed on the right inner side wall and the right lateral wall, respectively. The latch members at the first upper and lower positions are disposed outboard to and are movable respectively towards the cavity members. Two biasing members are disposed to bias respectively the latch members to move towards the cavity members. Two ejecting members are adapted to be disposed between the right lateral wall and the right inner side wall at second upper and lower positions respectively which are proximate to said first upper and lower positions, respectively. Each ejecting member is disposed along the transverse direction such that each ejecting member is actuated in response to a manual movement which is against biasing action of a respective biasing member in order to be adapted to lift the right lateral wall of the battery pack to move away from the right inner side wall of the bottom wall of the portable battery-powered apparatus and out of a major surface of the bottom wall so as to rotate a left lateral wall of the battery pack, thereby facilitating removal of the battery pack from the portable battery-powered apparatus.

Preferably, each ejecting member includes a cam surface which is adapted to be disposed on the right lateral wall along the transverse direction, and a cam follower which is adapted to extend from the right inner side wall toward the right lateral wall to move on the cam surface so as to permit lifting of the right lateral wall to move away from the right inner side wall when the respective latch member is moved away from the corresponding cavity member.

BRIEF DESCRIPTION OF THE DRAWINGS

Other features and advantages of the present invention will become apparent in the following detailed description of the preferred embodiment of the invention, with reference to the accompanying drawings, in which:

FIG. 3 is an exploded view of the locking device according to the preferred embodiment;

FIG. 4 is a perspective view of a portion of the locking device of the preferred embodiment;

FIG. 5 is a perspective view of another portion of the locking device of the preferred embodiment;

DETAILED DESCRIPTION OF THE PREFERRED EMBODIMENT

Figure 1:
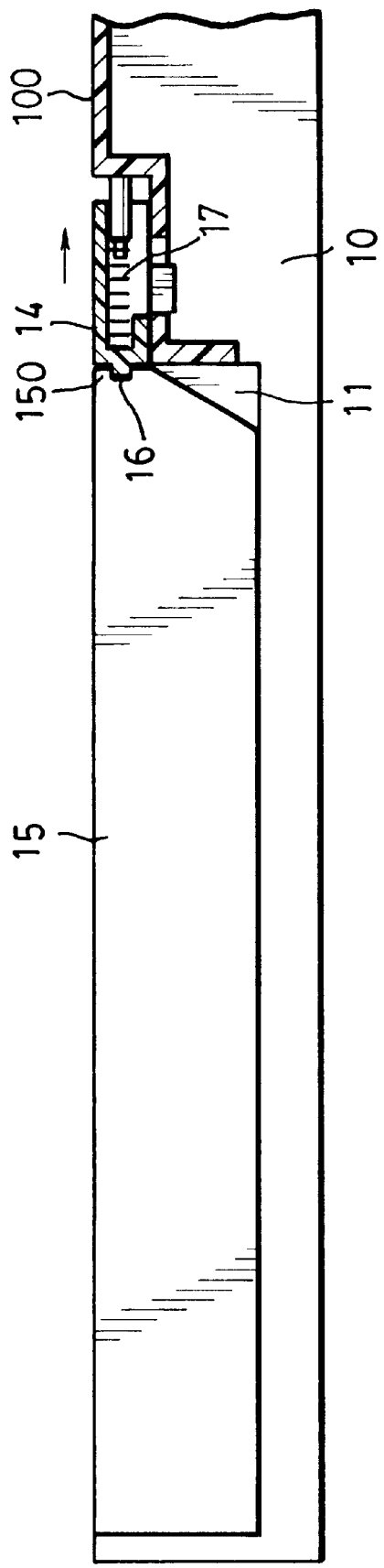
FIG. 1 is a schematic view of a conventional locking device for securing a battery pack to a portable computer.
Figure 2:
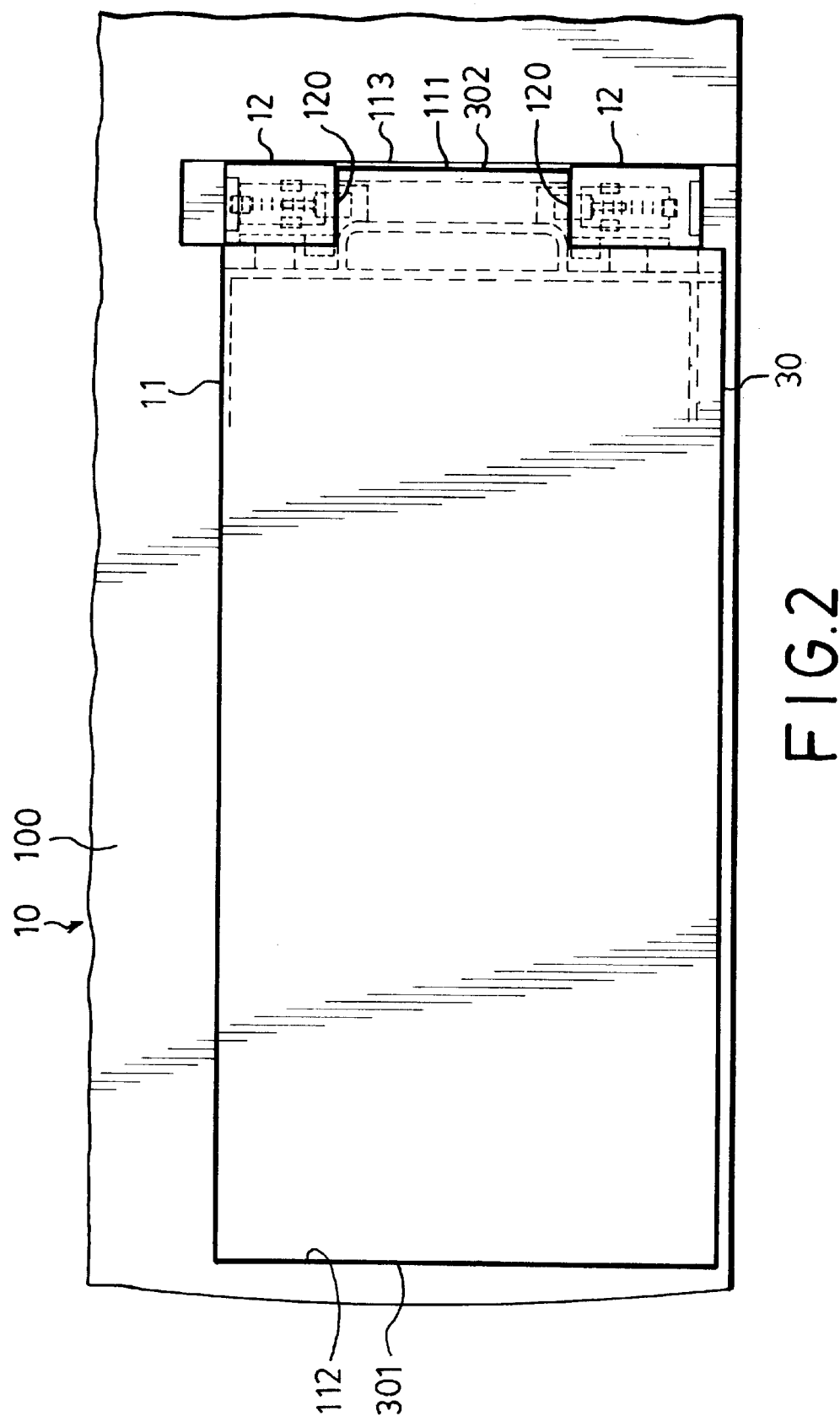
FIG. 2 is a schematic view of a preferred embodiment of a locking device disposed between a battery pack and a portable computer according to this invention.

Referring to FIG. 2, the preferred embodiment of the locking device according to the present invention is shown to be disposed between a battery pack 30 and a bottom wall 100 of a portable battery-power apparatus, such as a portable computer 10. The bottom wall 100 has a major surface and an inner peripheral wall which extends inwardly of and upwardly from the major surface. The inner peripheral wall defines an accommodation chamber 11 with an opening to permit access from the major surface, and has left and right inner side walls 112, 113 which are spaced apart from each other in a longitudinal direction. The left inner side wall 112 defines an axis of rotation which is transverse to the longitudinal direction. The battery pack 30 has a major wall, and left and right lateral walls 301, 302 opposite to each other and transverse to the major wall. When the battery pack 30 is inserted into the accommodation chamber 11 from the major surface, the left and right lateral walls 301, 302 mate with the left and right inner side walls 112, 113, respectively. The left lateral wall 301 is disposed to be rotatable relative to the left inner side wall 112 about the axis of the rotation when the right lateral wall 302 is moved away from the right inner side wall 113 and out of the major surface of the bottom wall 100.

With reference to FIGS. 3, 4 and 5, the locking device comprises upper and lower engaging seats 12 which are formed integrally and respectively on two side edges of the right inner side wall 113 and which are spaced apart from each other in a transverse direction relative to the longitudinal direction and parallel to the axis of rotation so as to define an engaging portion 111 of the accommodation chamber 11 between the upper and lower engaging seats 12. The right lateral wall 302 has upper and lower side edges 31, and a flap portion 33 between the upper and lower side edges 31. The flap portion 33 mates with and is inserted in the engaging portion 111. Upper and lower protruding plates 34 are formed on the right lateral wall 302 and are spaced apart from the flap portion 33 so as to confine two cavity members 340 therebetween.

Upper and lower engaging members 20 are mounted movably and respectively in the upper and lower engaging seats 12. Each of the upper and lower engaging members 20 includes an operating plate 21, and a latch member 23 which extends from the operating plate 21 in the transverse direction to pass through a through hole 120 of the respective engaging seat 12. The latch member 23 is disposed outboard to and is movable towards a respective cavity member 340 so as to define an upper or lower assembly with the respective cavity member 340. The latch and cavity members 23,340 are located respectively at first upper and lower positions that are aligned with each other in the transverse direction. Each of the upper and lower engaging members 20 further includes a cam follower 24 which extends transverse to the latch member 23 toward the upper or lower side edge 31 of the right lateral wall 302. Two biasing members 25, such as compression springs, are disposed respectively in the engaging seats 12 to bias the latch members 23 to move towards the corresponding cavity member 340.

In addition, two cam surfaces 32 are formed respectively on the upper and lower side edges 31 along the transverse direction so as to define two ejecting members with the cam followers 24.

Figure 6:
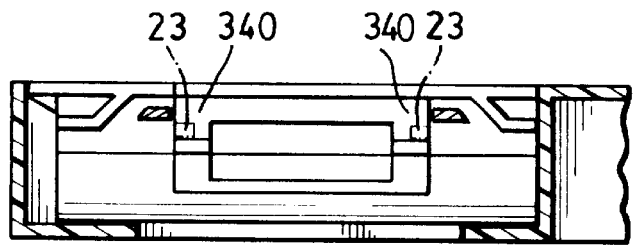
FIG. 6 is a side view of the locking device when the battery pack is secured to the portable computer.

As shown in FIG. 6, the latch members 23 engage the cavity members 340 by means of the biasing force of the biasing members 25, thereby securing the battery pack 30 in the accommodation chamber 11 of the portable computer 10.

Figure 7:
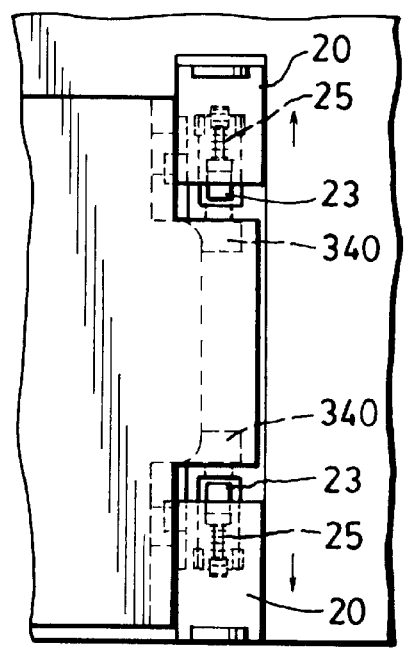
FIG. 7 is a schematic view showing the locking device in an opened state.
Figure 8:
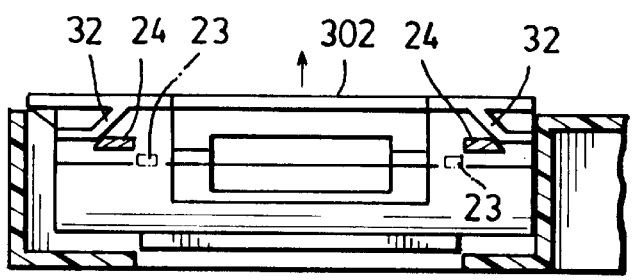
FIG. 8 is a schematic view showing how the locking device is actuated to lift the battery pack from the portable computer.

As shown in FIG. 7, when the user operates the operating plates 21 to move the upper and lower engaging members 20 in the transverse direction opposite to each other against the biasing force of the biasing members 25, the latch members 23 are moved away from the corresponding cavity members 340. At the same time, as shown in FIG. 8, the cam followers 24 are moved along the corresponding cam surfaces 32 so as to lift the right lateral wall 302 to move away from the right inner side wall 113 of the battery pack 30 and out of the major surface of the bottom wall 100 of the portable computer 10. The left lateral wall 301 of the battery pack 30 can be rotated about the axis of rotation, thereby facilitating removal of the battery pack 30 from the portable computer 10 without using any tool.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An easily releasable locking device for detachably securing a battery pack to a portable battery-powered apparatus with a bottom wall having a major surface, and an inner peripheral wall extending inwardly of and upwardly from the major surface, the inner peripheral wall defining an accommodation chamber with an opening to permit access from the major surface, and having left and right inner side walls spaced apart from each other in a longitudinal direction, the left inner side wall defining an axis of rotation which is transverse to the longitudinal direction, the battery pack having a major wall, and left and right lateral walls opposite to each other and transverse to the major wall, the left and right lateral walls mating respectively with the left and right inner side walls when the battery pack is inserted into the accommodation chamber from the major surface, the left lateral wall being disposed to be rotatable relative to the left inner side wall about the axis of rotation when the right lateral wall is moved away from the right inner side wall and out of the major surface, said locking device comprising:

upper and lower assemblies of latch and cavity members adapted to be disposed between the right lateral wall and the right inner side wall respectively at first upper and lower positions which are aligned with each other and which are spaced apart from each other in a transverse direction relative to the longitudinal direction and parallel to the axis of rotation, said latch member and said cavity member of each of said upper and lower assemblies at a respective one of said first upper and lower positions being adapted to be disposed on the right inner side wall and the right lateral wall respectively, such that said latch members at said first upper and lower positions are disposed outboard to and are movable respectively towards said cavity members;

two biasing members disposed to bias respectively said latch members to move towards said cavity members; and two ejecting members adapted to be disposed between the right lateral wall and the right inner side wall at second upper and lower positions respectively which are proximate to said first upper and lower positions respectively, each of said ejecting members being disposed along said transverse direction, such that each of said ejecting members is actuated in response to a manual movement which is against biasing action of a respective one of said biasing members in order to be adapted to lift the right lateral wall to move away from the right inner side wall and out of the major surface so as to rotate the left lateral wall, thereby facilitating removal of the battery pack from the portable battery-powered apparatus.

2. The easily releasable locking device as claimed in claim 1, wherein each of said ejecting members includes a cam surface adapted to be disposed on the right lateral wall along said transverse direction, and a cam follower adapted to extend from the right inner side wall toward the right lateral wall to move on said cam surface so as to permit lifting of the right lateral wall to move away from the right inner side wall when a respective one of said latch members is moved away from a corresponding one of said cavity members.

3. In combination, an electronic device having an accommodation chamber including first and second parallel walls and third and fourth walls extending between the first and second parallel walls; a battery pack fitting into the accommodation chamber, the battery pack having (a) fifth and sixth parallel walls respectively in close proximity to the first and second parallel walls and (b) seventh and eighth walls respectively in close proximity to the third and fourth walls;

a locking arrangement for securing the battery pack in the accommodation chamber and selectively enabling the battery pack to be removed from the accommodation chamber by turning the fifth wall about the first wall and lifting the sixth wall from close proximity to the second wall; the locking arrangement including: (a) first and second latch members arranged for longitudinal movement in the same direction as the direction of extent of the first, second, fifth and sixth walls, and (b) first and second cavity members positioned to respectively receive the first and second latch members while the latch members hold the battery pack in the accommodation chamber, and (c) first and second bias members respectively assoicated with the first and second latch members; the first and second latch members, the first and second bias members, and the first and second davity members being arranged so that (a) the first and second latch members are respectively urged against the first and second cavity members by the first and second bias members to hold the battery pack in the accommodation chamber and (b) the first and second latch members are released from the first and second cavity members in response to the first and second latch members being manually pushed against the first and second bias members to enable (i) the sixth side of the battery pack to be removed from the accommodation chamber and (ii) the fifth side of the battery pack to turn about the first side of the accommodation chamber, the battery pack including a flap portion carrying the first and second cavity members, the flap portion being along the sixth wall of the battery pack and removed from the fifth wall, and the electronic device carries (a) the first and second latch members and (b) the first and second bias members; the first and second cavity members, the first and second bias members, and the first and second latch members being arranged so that the first and second bias members respectively urge the first and second latch members toward each other and into the first and second cavity members while the battery pack is latched in the accommodation chamber.

4. The combination of claim 3 wherein the battery pack includes first and second cam surfaces and the electronic device includes first and second cam followers, the first and second cam followers being respectively coupled with the first and second latches so that (a) the first and second cam followers are spaced from the first and second cam surfaces when the battery pack is latched in the accommodation chamber by the first and second latches being biased into the first and second cavity members, and (b) the first and second cam followers respectively engage the first and second cam surfaces to assist in removing the battery pack from the accommodation chamber when the first and second latches are respectively released from the first and second cavity members.

5. The combination of claim 4 wherein the first latch member and the first cam follower are carried by a first structure and the second latch member and the second cam follower are carried by a secons structure, so that the first and second cam followers move in the same direction as the direction of extent of the first, second, fifth and sixth walls in response to the first and second latches and the first and second structures being moved against the biases of the first and second bias members.

6. The combination of claim 5 wherein each of the first and second cam surfaces includes a sloping surface respectively engaged by the first and second cam followers in response to the first and second structures being moved toward the third and fourth walls of the accommodation chamber, the sloping surfaces having a slope direction so that when the first and second cam followers respectively engage the first and second cam surfaces the fifth wall of the battery packs turns about the first wall of the accommodation chamber.

7. The combination of claim 3 wherein the battery pack includes first and second cam surfaces and the electronic device includes first and second cam followres, the first and second cam followers being respectively coupled with the first and second latches so that (a) the first and second cam followers are spaced from the first and second cam surfaces when the battery pack is latched in the accommodation chamber by the first and second latches being biased into the first and second cavity members, and (b) the first and second cam followers respectively engage the first and second cam surfaces to assist in removing the battery pack from the accommodation chamber when the first and second latches are respectively released from the first and second cavity members.

8. The combination of claim 7 wherein the first latch member and the first cam follower are carried by a first structure and the second latch member and the second cam follower are carried by a second structure, so that the first and second cam followers move in the same direction as the direction of extent of the first, second, fifth and sixth walls in response to the first and second latches and the first and second structures being moved against the biases of the first and second bias members.

9. The combination of claim 8 wherein each of the first and second cam surfaces includes a sloping surface respectively engaged by the first and second cam followers in response to the first and second structures being moved toward the third and fourth walls of the accommodation chamber, the sloping surfaces having a slope direction so that when the first and second cam followers respectively engage the first and secomd cam surfaces the fifth wall of the battery packs turns about the first wall of the accommodation chamber.

* * * * *